Figure 1A:
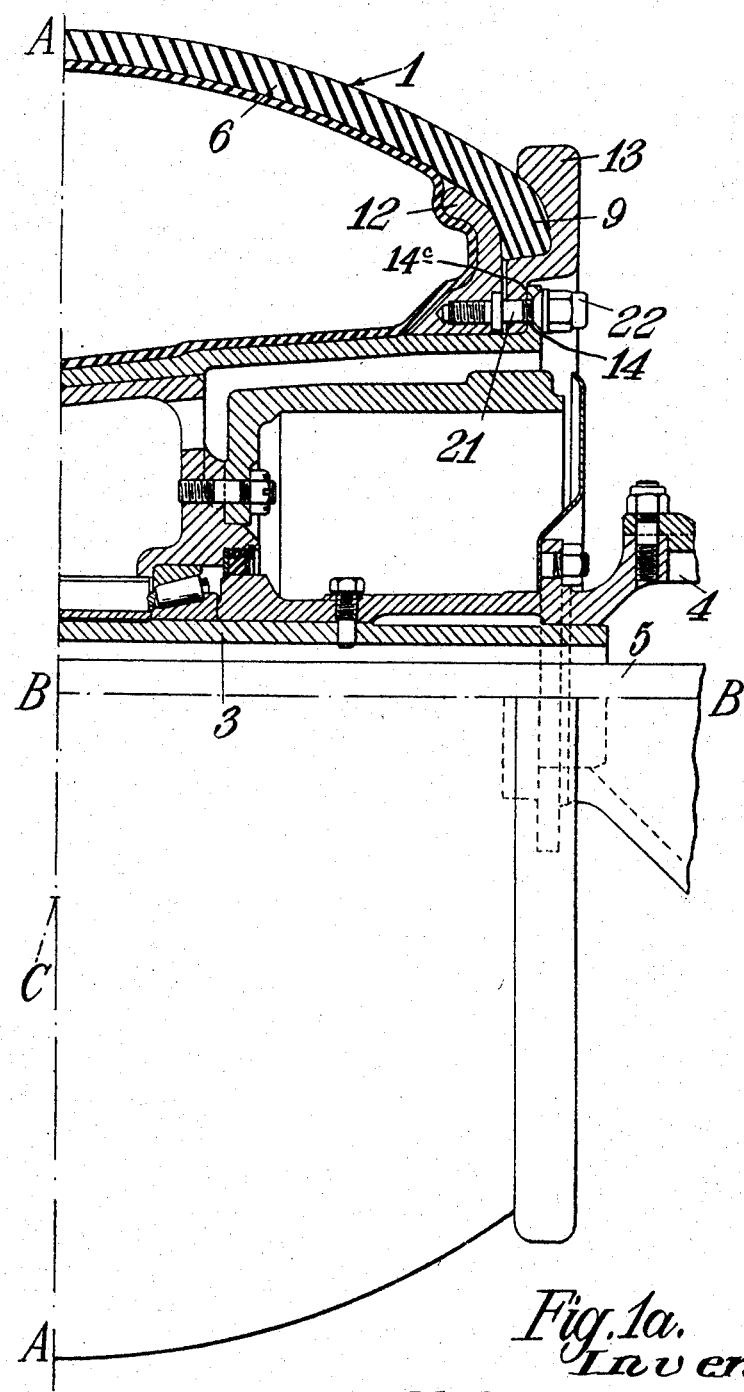

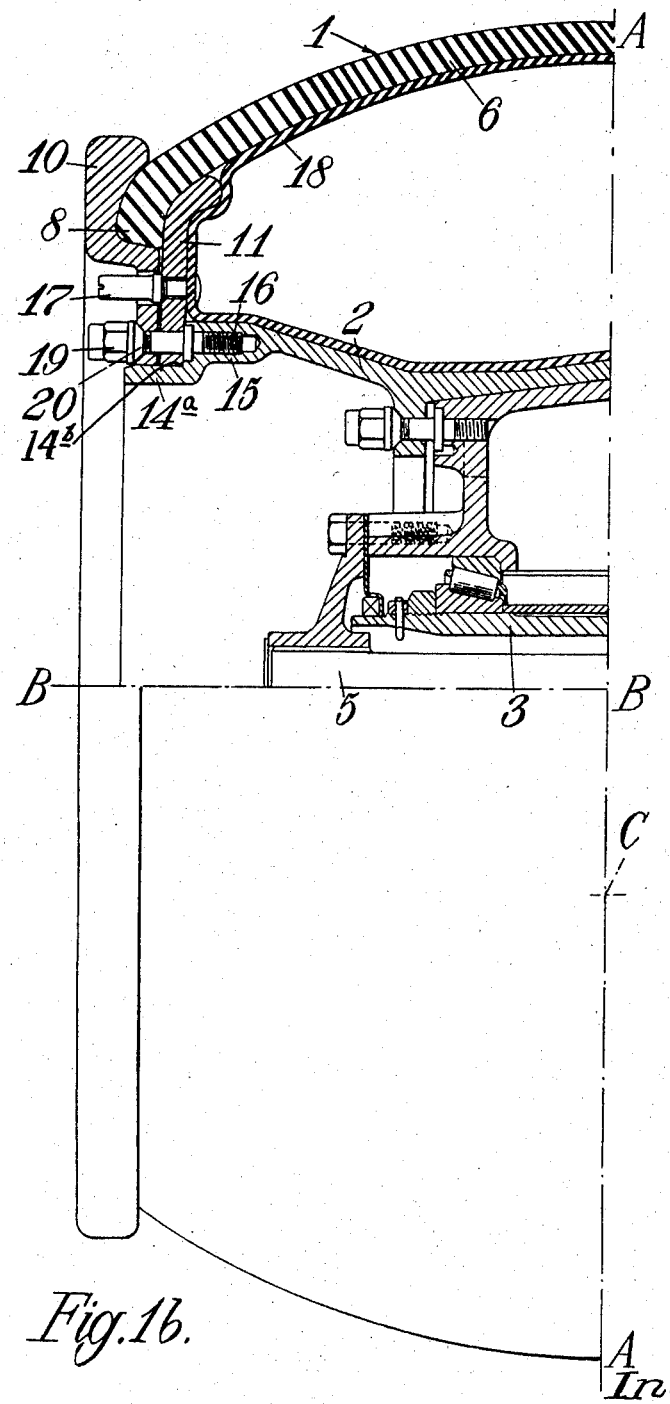

Jan. 13, 1959   N. P. S. STRAUSSLER   2,868,262
PNEUMATIC TIRES
Filed June 13, 1955   3 Sheets-Sheet 3
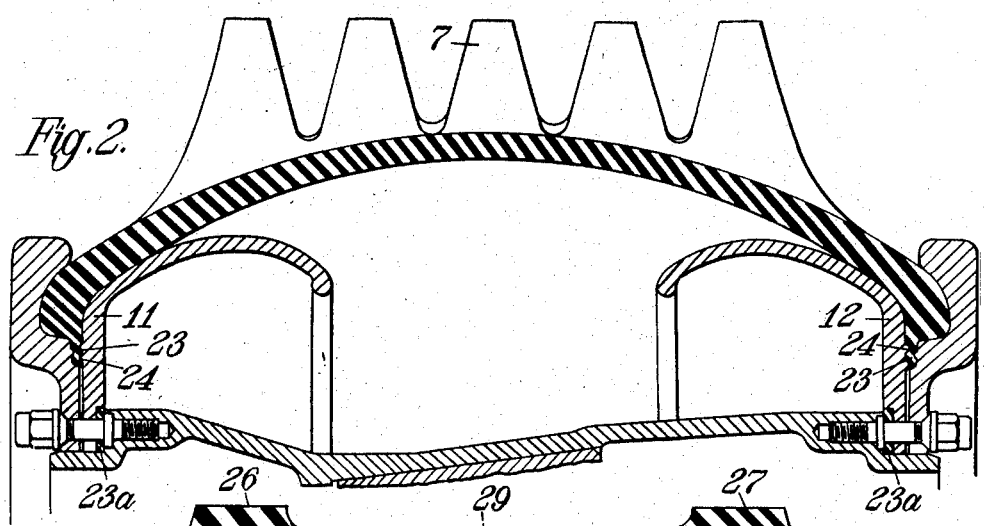
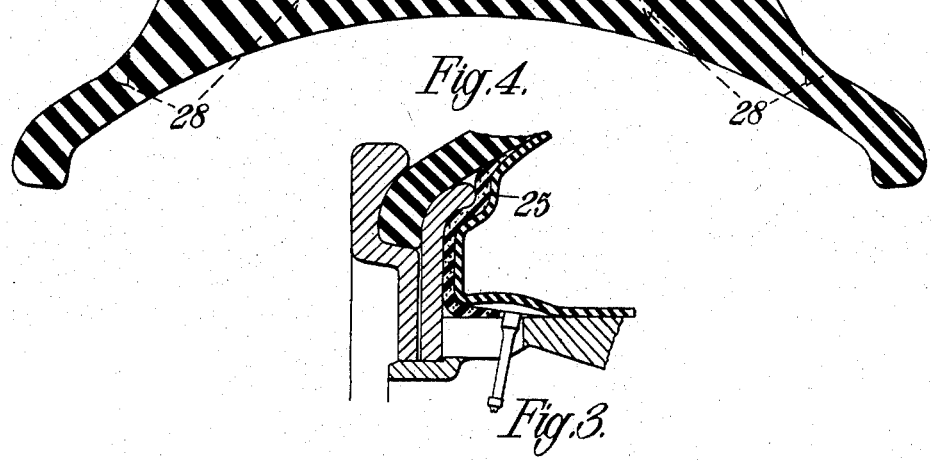
Inventor
N.P.S. Straussler
By Hancock Downing Seebold
Attys.

United States Patent Office

2,868,262
Patented Jan. 13, 1959

---

2,868,262

PNEUMATIC TIRES

Nicholas Peter Sorrell Straussler, London, England

Application June 13, 1955, Serial No. 515,153

Claims priority, application Great Britain June 23, 1950

14 Claims. (Cl. 152—401)

This application is a continuation in part of application Serial No. 232,363, now abandoned, filed on June 19, 1951. The invention relates to low pressure pneumatic tires for use in traversing soft ground or very rough ground and is applicable to road vehicles or for other purposes including the wheels of aircraft landing gear.

It is a primary object of the invention to provide an improved construction of low pressure tire which will present a very large area to the ground in comparison with the general size of the tire and particularly the maximum diameter thereof. A further object is to provide a tire having the above characteristics which can be manufactured relatively cheaply as compared with conventional tires presenting a similar area of contact with the ground. Another object is to provide a tire having the above characteristics which has an arch form in cross section so proportioned that there are substantially no free vertical side walls and under load the tire is deformed inwardly by a greater amount at the central area than at the sides. A further object of the invention is to provide a construction having the above characteristics in which the edges of the resilient tire casing are adequately protected against damage by stones or other irregularities in the ground over which the tire passes, this provision being important having regard to the relatively flat arch form of the tire as defined above. A further object is to provide a tire having the above characteristics with a mounting such as will enable the tire to be readily removed without dismantling the wheel, thus being important in view of the fact that tires in accordance with the present invention will generally be manufactured in large diameters or widths and will be correspondingly heavy. A further object of the invention is to provide a tire having the foregoing characteristics with a convenient form of emergency running surface which is adapted to come into action if the tire pressure should fall undesirably low.

It is a feature of a tire according to the invention that the casing of resilient material which forms with the rim assembly a low pressure air chamber is of transversely arched form with the margins thereof held on the rim assembly against radial and lateral movement so that the arched form subtends an angle within the range of 70 to 110 degrees with the apex of the said angle lying on the vertical center line of the rim assembly closer to the horizontal axis of the rim assembly than to the location of the periphery of the resilient casing and further that the margins of the said casing are constituted as beaded edges which are held to an inwardly directed form with the outer surfaces of such edges lying within a continuation of the transversely arched form of the casing and preferably lying in planes which are substantially perpendicular to the axis of the wheel and casing.

A further feature of the invention comprises the formation of the outer clamping rings for the beaded edges of the casing to afford adequate protection to the edges of the resilient casing in the event of the wheel passing over stones or irregularities in the ground which might otherwise cause nipping and consequent destruction of the casing. A further feature of the invention is the arrangement of the clamping rings for the beaded edges of the casing in such relation to an appropriate formation of the rim structure that the casing and clamping rings can readily be removed and replaced when required.

The tread is in the shape of the body of a barrel without end walls. The two margins of the body being secured against radial or lateral movement as by wheel discs with an axle extending through the centers of those said discs, suitable bearings being provided at each end of the said axle, the tread being the barrel shaped central portion, which is flexible and of vulcanized rubber or like resilient material to permit deformation both of itself and against the action of air under pressure in an air chamber.

Suitable studs of rubber or other material may be provided projecting from the outer surface of the tread. When such a tire is under load and running on hard ground with higher pressures than would normally be used on soft ground work, it might be an advantage to displace to one side the largest diameter of the barrel and this could be done by suitably shaping the tread carcass during moulding and vulcanization. If this displaced largest diameter portion is towards the outer side of the wheel tires as used, it would give an effect on hard roads of a wider track for the vehicle.

A further advantage of such a tire is that the deformation due to the load will be in the shape of an inverted bowl which will enclose an area of soft ground instead of squeezing it out as occurs with normal shaped tires. This enclosure of ground considerably adds to the shear resistance of the ground, increases the tractive effort that can be exerted by the vehicle and reduces skidding and slipping.

Considered in transverse cross section the tread would thus be of segmental arch form but said cross section may also be of elliptical arch form as will hereafter appear, or three centered arch form but the term arched form will be employed in the claims as also including elliptical arch form or three centered arch form.

For securing the margins and the support of the tire on the maximum load or in a deflated condition, the two margins are each clamped independently by two rings or wheel discs, although each pair of rings or wheel discs may be united in such a manner that the attachment to the hub is a simplified operation. The margins may be swelled out to form beads by a suitable wire or rubberized cord core to a circular cross section. Each circular cross section ring is clamped to the extent of more than half its circumference, by split rings. The outer ring, namely the part away from the body of the tire, being bolted on by a series of bolts or studs to the inner ring which is inside the body of the tire. This inner ring may extend laterally inwardly for a substantial way into the body of the tire, thus forming an inside supporting rim. Preferably the inner ring increases in diameter gradually as it progresses inwardly up to a certain distance and then falls away gradually to a smaller diameter, so that the general cross-sectional shape of the rim is bellied or arched and is of such a shape that when the tire is pressed in under excessive loading or through insufficient air pressure, the tire at each end is supported by these shaped rings.

These clamping rings may be fitted in such a manner that they are free to rotate. These rings may also have a covering of rubber so that, in effect they are solid or cushion tires. They may also have means of pneumatic inflation. When the tire is supported on these two end rings the free central portion is in the form of a concave depression and the load places the tire structure in pure tension.

Referring to the accompanying drawings:

Figures 1a and 1b are respectively right and left half diametral sectional elevations of a low inflation pressure pneumatic tire according to the invention, as mounted on a driven wheel of a motor vehicle, Figure 2 is a diametrical sectional elevation showing only the upper portion of a modification, Figure 3 is a similar view to Figure 2 of a further modification, and Figure 4 is a transverse section of a further modified form of casing or carcass of the tire.

Referring now in detail to Figures 1a and 1b, the low pressure pneumatic tire and wheel there shown is one of a pair of rear wheels of a tractor, each of which is driven from the engine of the vhicle through a differential gear.

The tire indicated by the general reference numeral 1 is carried on a wheel rim 2 which in turn is mounted on a central or hub portion of the wheel, which central portion rotates about a dead axle 3, secured to a differential gear box 4, and is driven by one of the output shafts 5 of the differential gear.

The tire comprises a casing or carcass 6 of vulcanized rubber or like resilient material which may comprise rubberized cord and having a tread portion 7 and beads 8 and 9, which may each have an internal core of wire or rubberized cord, it being understood that the carcass is vulcanized, in a mould substantially to the shape shown on the upper half of the figure. As will be seen therefrom the carcass considered as a whole is generally of the shape of the body of a barrel. As shown in Figures 1a and 1b, the transverse curvature of the inner surface of the carcass is arcuate, the arc excluding the beads being struck from a center or apex C on the vertical line A which is below the axis of rotation B of the wheel.

However the position of the center C on the center line A may be at or slightly above the crossing of the center line A and axis B. If it is on the crossing the inner surface of the carcass will be a spherical surface but if the center is below the crossing as shown said surface will be of substantially ellipsoid form. The outer surface of the carcass, Figures 1a and 1b are also of transversely arcuate form being also struck from a center a short distance below the center C whereby the thickness of the carcass gradually increases outwardly from both sides of the plane containing the center line A to the marginal portions or beads of the carcass which are inturned so as to be substantially radial to the axis of the wheel. The width of the tread portion may be substantially equal to one half that of the maximum diameter of the tread as shown in Figures 1a and 1b.

The carcass is held in position on the rim by clamping rings, those shown in Figure 1b being indicated by the reference numerals 10 and 11 and those shown in Figure 1a by the reference numerals 12 and 13.

The rings 10 and 11 loosely fit a cylindrical extension 14a of the rim of less diameter than the adjacent peripheral surface 15 of the rim thus providing an annular abutment surface 14b for the ring 11 constituting an inwardly projecting flange.

The rings 10 and 11 are apertured for the extension therethrough of a plurality of studs 16, only one of which appears in Figure 1b, and which are screwed into bores in the rim, and an inflating valve 17 of a pneumatic tube 18.

The outer portion of the ring 11 is curved inwardly so as to fit the adjacent inner surface of the bead 8, and the outer portion of the ring 10 is of transversely angular formation and has its inner surfaces shaped to fit the adjacent outer surface of the bead 8 and the under surface of the latter. Also the rings 10 and 13 constitute substantial and reinforced wall portions which protect the outer edge portions of the resilient casing 1. Clamping of the bead 8 is effected by means of cap nuts 19 screwed on to the free ends of the studs 16, the nuts having coned surfaces 20 to co-operate with similar surfaces surrounding the inner ends of the apertures through which the studs extend.

The clamping rings 12 and 13 for the bead 9 are similar to the rings 10 and 11 in respect of their clamping portions. However the ring 12 has its inner portion of wedge shape transversely to provide for bores, only one of which appears in Figure 1a, for screwed inner ends of studs 21 which extend through apertures in the inner portion of the ring 13 and aligned apertures in a flange 14 projecting outwardly from the rim and affording an annular abutment surface 14c for the ring 13. The outer portions of the studs are screw threaded for cap nuts 22, the arrangement being such that on screwing up the nuts 22 on the studs 21 the clamping ring 12 will slide axially on the rim and clamp the bead 9 between itself and the ring 13.

When a vehicle having tires as above described is travelling over ordinary roads there will be more or less flattening of the central zone of the tire on the road surface in the case of light loads, but with heavier loads the central zone will be deformed inwardly to such an extent that it will be in the shape of an inverted bowl of elliptical contour, and if the vehicle is travelling over soft ground the bowl will be filled therewith so that shear resistance of the ground is increased and traction will thus be greater. This effect is produced because the carcass is of barrel or arcuate form transversely, having no free or unrestrained vertical side walls, and the clamping of the beads or margins from radial or lateral movement so that in effect it is a resilient arch which under load is deformed radially inwardly a considerably greater amount at the central zone than at the sides, the deformation gradually decreasing from the central zone to zero where the sides are clamped. The modification, Figure 2, shows a wheel rim and tire according to the invention, in which a pneumatic tube is not required so that air under pressure acts directly on the inner side of the carcass. In order to seal the rim and beads against leakage of air under pressure from the annular space afforded by the rim, the rings 11 and 12 and the inner surface of the carcass, the beads of the latter are each provided with an inwardly projecting annular flange 23 of rubber. Each flange 23 lies between oppositely facing surfaces of the rings 11, 12 and the latter are provided with annular beads 24 which are arranged so that in clamping the beads the flanges 23 will be distorted and annular sealing will be produced. Each inner clamping ring also has inset therein an annular sealing ring 23a of rubber which engages the shoulders.

In this form of the invention the inner clamping rings may be provided with annular extensions of arched form in cross section to provide supporting rims within the air space so that under very heavy loading or insufficient air pressure in the air space the side zones of the tread will engage with and be supported by these rims. The latter may be covered on their outer surfaces with a layer of rubber vulcanized to the rims so that when the load is such that the side zones of the tread engage the rubber covered rims the tire in effect becomes a solid or cushion tire and the stresses are such that the tread or carcass is transversely under tension in opposite directions inwardly to its central plane.

Referring now to Figure 3 this shows a different and preferred location of the tire inflation valve to that shown in Figure 1b, the valve extending from the inner portion of the pneumatic tube through a slot in the wheel rim. This figure also shows side liners 25 of soft rubber adhered to the exterior of the pneumatic tube or the carcass but a single layer may be provided which is adhered to the inner surface of the tread or carcass and terminating at the beads.

The tread or carcass may also have outwardly projecting rubber studs 26 as indicated by the reference numeral and arranged in rows transverse to the tread.

Referring now to Figure 4 the casing or carcass is provided with elevated annular tread ribs 26, 27 widely spaced apart laterally and affording an annular depression between them. There may also be provided on either side of each rib an inwardly extending annular groove 28 substantially V-shape in cross section, as shown in dotted lines in the figure, and a further annular groove 29 may be provided extending inwardly from the central part of the depression. The ribs 26 and 27 and depression and the grooves 28 and 29 if provided facilitate the inward flexing or deformation of the carcass or case so as to increase shear resistance and traction as hereinbefore referred to.

I claim:

1. A rim assembly for a low pressure tire of large size, said tire being of the character comprising an annular casing of vulcanized resilient material of transversely arched form subtending an angle within the range of 70 to 110 degrees with the apex of the angle lying on the vertical center line of the rim assembly closer to the horizontal axis of the rim assembly than to the location of the periphery of said casing, said casing including margins constituted as substantially radially inwardly directed beaded edges and adapted to form with the rim assembly a chamber for air under low pressure, said rim assembly comprising an annular rim structure having a radially inwardly extending flange at one end thereof and a radially outwardly extending flange at the other end thereof, said radially inwardly extending flange having an outer face, said radially outwardly extending flange having an inner face, a first pair of separate inner and outer clamping rings shaped to receive and clamp between them one of the said beaded edges of the casing, means for drawing said rings together and for releasably securing them to the outer face of said radially inwardly extending flange for axial withdrawal therefrom when released, a second pair of separate inner and outer clamping rings shaped to receive and clamp between them the other of said beaded edges of the casing, means for drawing said second pair of rings together and for releasably securing them to said radially outwardly extending flange, at least the inner ring of said second pair of clamping rings being located adjacent the inner face of said flange, and the external diameter of said annular rim structure in the area between said flanges not exceeding the internal diameter of said last-mentioned inner clamping ring whereby upon release of the two sets of clamping rings the tire casing and at least three of the clamping rings can be withdrawn axially from the rim structure.

2. A rim assembly according to claim 1 in which the two rings of the second pair of clamping rings are both located adjacent the inner face of said radially outwardly extending flange whereby upon release of the two sets of clamping rings the tire casing and the four rings can be withdrawn axially from said annular rim structure.

3. A rim assembly according to claim 1 in which the means for releasably securing each of the pairs of rings comprise bolts disposed in aligned apertures in the respective pairs of rings.

4. A rim assembly according to claim 1 in which the means for releasably securing each of the pairs of rings comprise bolts disposed in aligned apertures in the rings and annular rim structure, the bolts associated with at least one pair of the clamping rings being in threaded engagement with said annular rim structure, and cap nuts threaded on the bolts for drawing the rings together.

5. A rim assembly according to claim 1 in which said annular rim structure has cylindrical end surfaces adjacent the flanges and the clamping rings of each pair being slidable axially upon and supported by said cylindrical end surfaces.

6. A rim assembly for a low pressure tire of large size, said tire being of the character comprising an annular casing of vulcanized resilient material of transversely arched form subtending an angle within the range of 70 to 110 degrees with the apex of the angle lying on the vertical center line of the rim assembly closer to the horizontal axis of the rim assembly than to the location of the periphery of the casing, said casing having margins constituted as substantially radially inwardly directed beaded edges and adapted to form with the rim assembly a chamber for air under low pressure, said rim assembly comprising an annular rim structure having a flange at each end thereof at least one of said flanges being radially inwardly directed, a first pair of separate inner and outer clamping rings shaped to receive and clamp between them one of the said beaded casing edges, means for drawing together and for releasably securing said rings to said radially inwardly directed end flange of said annular rim structure for axial withdrawal therefrom when released, a second pair of separate inner and outer clamping rings shaped to receive and clamp between them the other of said beaded edges of the casing, and means for drawing said rings together and for releasably securing them to the other end flange of the rim structure, and both said drawing together and releasable securing means being independent of one another and independently secured to the rim structure.

7. A rim assembly according to claim 6 in which the means for releasably securing each of the pairs of rings comprise bolts passing through aligned holes in the rings and independently secured to the rim structure, and cap nuts threaded on the bolts for drawing the rings together.

8. A rim assembly according to claim 6 in which the inner ring of each pair of clamping rings has a laterally and axially inwardly directed extension from the end portion thereof, radially remote from said annular rim structure, said extension having an outer surface of arcuate form having a radius less than that of the tire casing to provide a pair of axially spaced emergency supporting rims for the tire casing to prevent complete collapse thereof.

9. A low pressure tire and rim assembly comprising, in combination, an annular casing of vulcanized resilient material of transversely arched form subtending an angle within the range of 70 to 110 degrees with the apex of the angle lying on the vertical center line of the tire and rim assembly closer to the horizontal axis of the rim assembly than to the periphery of said casing, said casing having margins constituted as substantially radially inwardly directed beaded edges and adapted to form with the rim assembly a chamber for air under low pressure, an annular rim structure having a radially inwardly extending flange at one end thereof and a radially outwardly extending flange at the other end thereof, said radially inwardly extending flange having an outer face, said radially outwardly extending flange having an inner face, a first pair of separate inner and outer clamping rings shaped to receive and clamp between them one of the said beaded edges of the casing, means for drawing said rings together and for releasably securing them to the outer face of said radially inwardly extending flange for axial withdrawal therefrom when released, a second pair of separate inner and outer clamping rings shaped to receive and clamp between them the other of said beaded edges of the casing, means for drawing said second pair of rings together and for releasably securing them to said radially outwardly extending flange, at least the inner ring of said second pair of clamping rings being located adjacent the inner face of said radially outwardly extending flange, and the external diameter of the annular rim structure in the area between the flanges not exceeding the internal diameter of said last-mentioned inner clamping ring whereby upon release of the two sets of clamping rings the tire casing and at least three of the clamping rings can be withdrawn axially from the rim structure.

10. A tire and rim assembly according to claim 9 in which the two rings of the second pair of clamping rings are both located adjacent the inner face of said radially outwardly extending flange whereby upon release of the two sets of clamping rings the tire casing and the four rings can be withdrawn axially from the rim structure.

11. A tire and rim assembly according to claim 9 in which the means for releasably securing each of the pairs of rings comprise bolts disposed in aligned apertures in the rings and rim structure, the bolts associated with at least one pair of rings being in threaded engagement with the rim structure, and cap nuts threaded on the bolts for drawing the rings together.

12. A low pressure tire and rim assembly comprising, in combination, an annular casing of vulcanized resilient material of transversely arched form subtending an angle within the range of 70 to 110 degrees with the apex of the angle lying on the vertical center line of the rim assembly closer to the horizontal axis of the rim assembly than to the periphery of said casing, said casing having margins constituted as substantially radially inwardly directed beaded edges and adapted to form with the rim assembly a chamber for air under low pressure, an annular rim structure having a flange at each end thereof, at least one of said flanges being radially inwardly directed, a first pair of separate inner and outer clamping rings shaped to receive and clamp between them one of the said beaded casing edges, means for drawing together and for releasably securing said rings to said radially inwardly directed end flange of the rim structure for axial withdrawal therefrom when released, a second pair of separate inner and outer clamping rings shaped to receive and clamp between them the other of said beaded edges of the casing, and means for drawing said rings together and for releasably securing them to the other end flange of the rim structure, and both said drawing together and releasable securing means being independent of one another and independently secured to the rim structure.

13. A tire and rim assembly according to claim 12 in which said rim structure has cylindrical end surfaces adjacent the flanges and the clamping rings of each pair being slidable axially upon and supported by said cylindrical end surfaces.

14. A tire and rim assembly according to claim 12 in which the inner ring of each pair of clamping rings has a laterally and axially inwardly directed extension from the end portion thereof radially remote from said rim structure, said extension having an outer surface of arcuate form having a radius less than that of the tire casing to provide a pair of axially spaced emergency supporting rims for the tire casing to prevent complete collapse thereof.

References Cited in the file of this patent

UNITED STATES PATENTS

| | | |
|---|---|---|
| 997,809 | Harrison | July 11, 1911 |
| 1,265,773 | Guerrero | May 14, 1918 |
| 1,462,117 | McClintock | July 17, 1923 |
| 1,497,404 | Patch | June 10, 1924 |
| 1,657,533 | Forsyth | Jan. 31, 1928 |
| 1,842,219 | Trautman | Jan. 19, 1932 |
| 2,074,284 | Stevenson | Mar. 16, 1937 |
| 2,405,954 | Hollerith | Aug. 20, 1946 |